(12) United States Patent
Kim et al.

(10) Patent No.: US 8,204,127 B2
(45) Date of Patent: Jun. 19, 2012

(54) METHOD AND APPARATUS FOR ENCODING AND DECODING IMAGE BY USING MULTIPLE REFERENCE-BASED MOTION PREDICTION

(75) Inventors: Il-koo Kim, Osan-si (KR); Woo-jin Han, Suwon-si (KR); Yu-mi Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 653 days.

(21) Appl. No.: 12/388,662

(22) Filed: Feb. 19, 2009

(65) Prior Publication Data

US 2009/0220005 A1 Sep. 3, 2009

(30) Foreign Application Priority Data

Mar. 3, 2008 (KR) .................. 10-2008-0019642

(51) Int. Cl.
*H04N 11/02* (2006.01)
*H04N 11/04* (2006.01)

(52) U.S. Cl. .................. 375/240.16; 375/240.14

(58) Field of Classification Search .................. None
See application file for complete search history.

(56) References Cited

U.S. PATENT DOCUMENTS 6,807,231 B1 * 10/2004 Wiegand et al. ......... 375/240.12

FOREIGN PATENT DOCUMENTS

| KR | 10-1999-0027469 A | 4/1999 |
| KR | 10-1999-0031322 A | 5/1999 |
| KR | 10-0488043 B1 | 11/2005 |
| KR | 10-2007-0115309 A | 12/2007 |

OTHER PUBLICATIONS

Search Report dated Aug. 28, 2009 issued by the International Searching Authority.
M. Flierl et al., "Generalized B Pictures and the Draft H.264/AVC Video-Compression Standard." IEEE Transactions on Circuits and Systems for Video Technology, IEEE Service Center, , vol. 13, No. 7, Jul. 1, 2003, pp. 587-597, XP011099251, ISSN: 1051-8215, DOI: DOI:10.1109/TCSVT.2003.814963.
Search Report dated May 9, 2011 from the European Patent Office in counterpart European application No. 09716619.3.
M. Suzuki et al., "Inter Frame Coding with Template Matching Averaging", Image Processing, 2007. ICIP 2007. IEEE International Conference on, IEEE, Sep. 1, 2007, pp. III-409-III-412, XP031158091, ISBN: 978-1-4244-1436-9.

(Continued)

*Primary Examiner* — Clemence Han
(74) *Attorney, Agent, or Firm* — Sughrue Mion, PLLC (57) ABSTRACT

Provided are a method and apparatus for encoding an image by using motion prediction and a method and apparatus for decoding an image by using motion prediction. The method of encoding an image by using motion prediction, the method includes: determining at least one candidate predictor set including at least one candidate predictor within a candidate predictor range away from a location of a current predictor in a reference frame; determining a reference predictor based on a distortion rate of hypothesis predictors determined according to the at least one candidate predictor of each of the at least one candidate predictor set; performing motion prediction with regard to a current frame by using a reference block corresponding to the reference predictor and a current block; and encoding image data including the current frame based on a result of the motion prediction.

25 Claims, 9 Drawing Sheets

OTHER PUBLICATIONS

Y. Huang et al., "Survey on Block Matching Motion Estimation Algorithms and Architectures with New Results", Journal of VLSI Signal Processing, vol. 42, No. 3, Feb. 13, 2006, pp. 297-320, XP019410185: ISSN: 1573-109X, DOI: DOI:10.1007/S11265-006-4190-4.

S. Kamp et al: "Decoder Side Motion Vector Derivation", 82. Mpeg Meeting, Oct. 22, 2007-Oct. 26, 2007, (Motion Picture Expert Group or ISO/IEC JTC1/SC29/WG11), XP030043523.

S. Kamp et al., :Multihypothesis Prediction Using Decoder Side Motion Vector Derivation in Inter Frame Video Coding, Visual Communications and Image Processing, Jan. 20, 2009-Jan. 22, 2009, XP030081712, 8 pages.

Communication from the European Patent Office issued Jan. 23, 2012 in counterpart European Application No. 09716619.3.

\* cited by examiner

CURRENT PREDICTOR

DISTANCE

- DIRECTION
  - DIRECTION 0: NO PROCESSING (CODE 0)
  - DIRECTION 1: HORIZONTAL DIRECTION (CODE 100)
  - DIRECTION 2: VERTICAL DIRECTION (CODE 101)
  - DIRECTION 3: RIGHT DOWNWARD DIAGONAL DIRECTION (CODE 110)
  - DIRECTION 4: LEFT DOWNWARD DIAGONAL DIRECTION (CODE 111)
- DISTANCE
  - DISTANCE 1: QUARTER-PEL DISTANCE (CODE 0)
  - DISTANCE 2: HALF-PEL DISTANCE (CODE 1)

METHOD AND APPARATUS FOR ENCODING AND DECODING IMAGE BY USING MULTIPLE REFERENCE-BASED MOTION PREDICTION

CROSS-REFERENCE TO RELATED PATENT APPLICATION

This application claims the benefit of Korean Patent Application No. 10-2008-0019642, filed on Mar. 3, 2008, in the Korean Intellectual Property Office, the disclosure of which is incorporated herein in its entirety by reference.

BACKGROUND OF THE INVENTION

1. Field of the Invention

Apparatuses and methods consistent with the present invention generally relate to encoding an image and decoding an image, and more particularly, to predicting motion between screens while an image is encoded or decoded.

2. Description of the Related Art

The H.264 video compression standard, which uses more various and complex technologies than related art video compression standards, greatly enhances compressibility and image quality. For these reasons, the H.264 standard has been used to substitute for related art video compression standards and spotlighted as an application technology of digital multimedia broadcasting (DMB), digital versatile disc (DVD) technology, etc.

Motion prediction of a H.264 encoder is performed by intraprediction and interprediction. Intraprediction is a process of performing block prediction of a current picture by using a reference picture that is decoded, is deblocking filtered, and stored in a buffer. In more detail, information regarding two or more pictures is used to perform intraprediction. Interprediction is a process of performing block prediction on a decoded picture by using pixel data of blocks adjacent to a block that is to be predicted. Intraprediction and/or interprediction is performed according to properties of pictures such as I pictures, P pictures, B pictures, and the like.

Motion estimation (ME) is a process of detecting a macroblock that is most similar to a macroblock of a current frame in a previous frame by using a predetermined measured function so as to obtain a motion vector indicating a difference in traveling locations of the two macroblocks. A representative method of detecting the most similar macroblock calculates similarity between the two macroblocks by using a predetermined measuring method by moving the macroblock of the current frame on a pixel basis within a determined detection range.

The predetermined measuring method obtains absolute values of differences in values of corresponding pixels between the macroblock of the current frame and macroblocks in a detection area and determines a macroblock having the smallest value obtained by summing absolute values as the most similar macroblock.

In more detail, similarities between macroblocks of current and previous frames are determined based on a similarity value, i.e., a matching reference value, obtained by using values of pixels included in macroblocks of the current and previous frames. The matching reference value is obtained by using a predetermined measuring function that is a sum of absolute differences (SAD), a sum of absolute transformed differences (SATD), a sum of squared differences (SSD), etc.

Figure 1A:
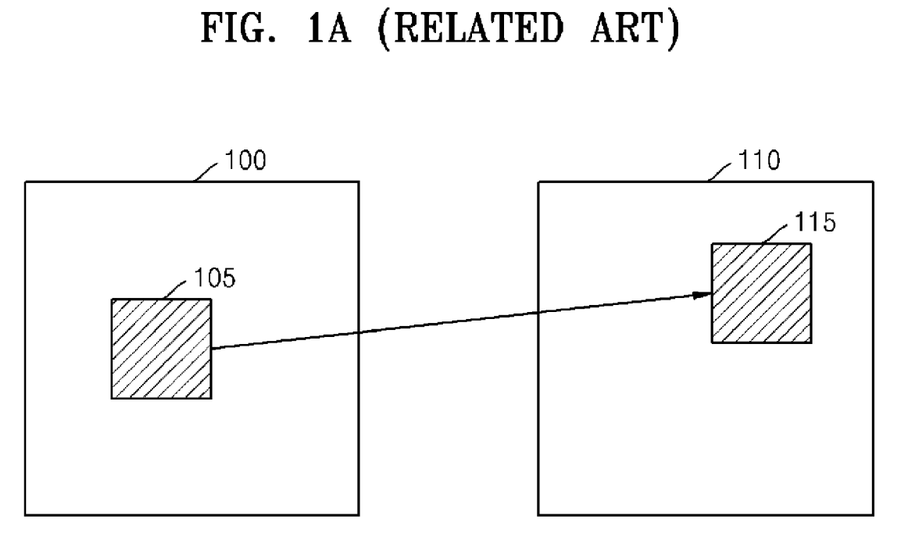
FIG. 1A illustrates motion prediction using a P picture in the H.264/AVC standard.

FIG. 1A illustrates motion prediction using a P picture in the H.264/Advanced Video Coding (AVC) standard. Referring to FIG. 1A, when the P picture is a current picture 110, a reference block 105 of a reference picture 100 is used to perform ME with regard to a current block 115 of the current picture 110.

Figure 1B:
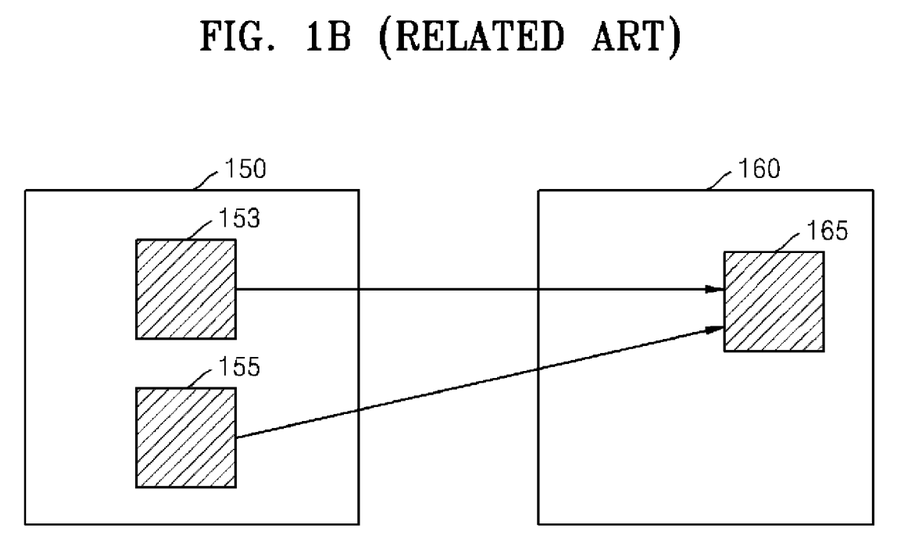
FIG. 1B illustrates motion prediction using a B picture in the H.264/AVC standard.

FIG. 1B illustrates motion prediction using a B picture in the H.264/AVC standard. Referring to FIG. 1B, ME with regard to the B picture is performed using different reference blocks 153 and 155 of a reference picture 150. The reference blocks 153 and 155 of the reference picture 150 are used to perform ME with regard to a current block 165 of a current picture 160. In this regard, it is necessary to encode an index of the reference blocks 153 and 155 and two motion vectors.

SUMMARY OF THE INVENTION

The present invention provides a method and apparatus for encoding an image, and a method of determining an exact reference block or predictor when the method and apparatus for decoding the image perform motion prediction by referencing a plurality of blocks.

The present invention also provides a method of minimizing additional information regarding motion information even though a plurality of reference blocks or predictors are used.

According to an aspect of the present invention, there is provided a method of encoding an image by using motion prediction, the method comprising: determining at least one candidate predictor set including at least one candidate predictor within a candidate predictor range away from a location of a current predictor in a reference frame; determining a reference predictor based on a distortion rate of hypothesis predictors determined according to candidate predictors of each candidate predictor set; performing motion prediction with regard to a current frame by using a reference block corresponding to the reference predictor and a current block; and encoding image data including the current frame based on a result of motion prediction.

The determining of the reference predictor may comprise: generating a hypothesis predictor list including hypothesis predictors of each candidate predictor set; and determining the reference predictor based on the distortion rate of the hypothesis predictors of the hypothesis predictor list.

The encoding of image data may comprise: encoding an index of the reference predictor.

In the determining of the at least one candidate predictor set, the candidate predictor range may comprise at least one of a range including predictors at a location a quarter-pel unit from the location of the current predictor, a range including predictors at a location a half-pel unit from the location of the current predictor, a range including predictors at a location an integer-pel unit from the location of the current predictor, and a predictor at the location of the current predictor.

In the determining of the at least one candidate predictor set, the candidate predictor set may comprise a set including a candidate predictor, a set including two candidate predictors, and a set including three candidate predictors within the candidate predictor range.

The determining of the reference predictor may comprise: determining an average value of candidate predictors of each candidate predictor set as hypothesis predictors with regard to the candidate predictor set; and comparing distortion rates of the hypothesis predictors and determining a hypothesis predictor having a minimum distortion rate as the reference predictor.

In the generating of the hypothesis predictor list, a hypothesis predictor of a candidate predictor set that includes the predictor at the location of the current predictor may be ranked higher than hypothesis predictors of candidate predictor sets that do not include the predictor at the location of the current predictor on the hypothesis predictor list.

In the generating of the hypothesis predictor list, a hypothesis predictor of a candidate predictor set having a small number of candidate predictors may be ranked higher than a hypothesis predictor of a candidate predictor set having a large number of candidate predictors.

The determining of the reference predictor may comprise: obtaining a mean squared error (MSE) with regard to a result of motion prediction by using each hypothesis predictor; and comparing the MSE of each hypothesis predictor and determining a hypothesis predictor having a minimum MSE as the reference predictor.

The determining of the at least one candidate predictor set may comprise: determining the candidate predictor range including four up, down, left, and right predictors located a predetermined distance from the location of the current predictor, and including four predictors located at both sides of two diagonals in view of the location of the current predictor; and determining two candidate predictors that face each other in view of the location of the current predictor from among the candidate predictors within the determined candidate predictor range to form the same candidate predictor set.

The method may further comprise: encoding information regarding a predetermined distance within the candidate predictor range and information regarding directions of the candidate predictors that form the candidate predictor set.

According to another aspect of the present invention, there is provided a method of decoding an image by using motion prediction, the method comprising: extracting image data, a motion vector, and predictor information for motion prediction from a received image datastream; determining a reference predictor with regard to a current block by using the predictor information; performing motion prediction with regard to the current frame by using the reference block corresponding to the reference predictor, the image data, and the motion vector; and reconstructing the current frame based on a result of motion prediction, wherein the reference predictor is determined as a predictor having a minimum distortion rate from among hypothesis predictors determined using at least one candidate predictor within a candidate predictor range away from a location of a current predictor in the reference frame.

The determining of the reference predictor may comprise: extracting location information from the predictor information; and determining a predictor located as indicated by the location information regarding the reference frame as the reference predictor.

The determining of the reference predictor may comprise: extracting distance information and direction information from the predictor information; determining a candidate predictor range located a predetermined distance according to the distance information from the location of the current predictor on the reference frame by using the distance information; determining candidate predictors located in a direction according to the direction information within the candidate predictor range by using the direction information; and determining the predictor having the minimum distortion rate by using the candidate predictors.

According to another aspect of the present invention, there is provided an apparatus for encoding an image by using motion prediction, the apparatus comprising: a candidate predictor set determining unit determining at least one candidate predictor set including at least one candidate predictor within a candidate predictor range away from a location of a current predictor in a reference frame; a reference predictor determining unit determining a reference predictor based on a distortion rate of hypothesis predictors determined according to candidate predictors of each candidate predictor set; a motion prediction performing unit performing motion prediction with regard to a current frame by using a reference block corresponding to the reference predictor and a current block; and an encoding unit encoding image data including the current frame based on a result of motion prediction.

The reference predictor determining unit may generate a hypothesis predictor list including hypothesis predictors of each candidate predictor set, and determine the reference predictor based on the distortion rate of the hypothesis predictors of the hypothesis predictor list.

The encoding unit may comprise: a predictor index encoding unit encoding an index of the reference predictor.

The reference predictor determining unit may determine an average value of candidate predictors of each candidate predictor set as a hypothesis predictor with regard to each candidate predictor set, compare distortion rates of the hypothesis predictors with regard to the candidate predictor sets, and determine a hypothesis predictor having a minimum distortion rate as the reference predictor.

The reference predictor determining unit may obtain an MSE with regard to a result of motion prediction by using each hypothesis predictor, compare the MSE of each hypothesis predictor, and determine a hypothesis predictor having a minimum MSE as the reference predictor.

The encoding unit may encode image data including the current frame based on the result of motion prediction, and encode information regarding a predetermined distance indicating the candidate predictor range and information regarding directions of the candidate predictors that form the candidate predictor set.

According to another aspect of the present invention, there is provided an apparatus for decoding an image by using motion prediction, the apparatus comprising: a data extracting unit extracting image data, a motion vector, and predictor information for motion prediction from a received image datastream; a reference predictor determining unit determining a reference predictor with regard to a current block by using the predictor information; a motion prediction performing unit performing motion prediction with regard to the current frame by using the reference block corresponding to the reference predictor, the image data, and the motion vector; and an image reconstructing unit reconstructing the current frame based on a result of motion prediction, wherein the reference predictor is determined as a predictor having a minimum distortion rate from among hypothesis predictors determined using at least one candidate predictor within a candidate predictor range in view of a location of a current predictor in the reference frame.

The reference predictor determining unit may extract location information from the predictor information, and determine a predictor located as indicated by the location information regarding the reference frame as the reference predictor.

The reference predictor determining unit may extract distance information and direction information from the predictor information, determine a candidate predictor range located a predetermined distance according to the distance information from the location of the current predictor on the reference frame by using the distance information, determine candidate predictors located in a direction according to the direction information within the candidate predictor range by using the direction information, and determine the predictor having the minimum distortion rate by using the candidate predictors.

According to another aspect of the present invention, there is provided a computer-readable recoding medium having recorded thereon a program for implementing a method of encoding an image by using motion prediction.

According to another aspect of the present invention, there is provided a computer-readable recoding medium having recorded thereon a program for implementing a method of decoding an image by using motion prediction.

BRIEF DESCRIPTION OF THE DRAWINGS

The above and other features of the present invention will become more apparent by describing in detail an exemplary embodiment thereof with reference to the attached drawings in which.

DETAILED DESCRIPTION OF THE INVENTION

Hereinafter, exemplary embodiments of the present invention will be described in detail with reference to the accompanying drawings.

Figure 2A:
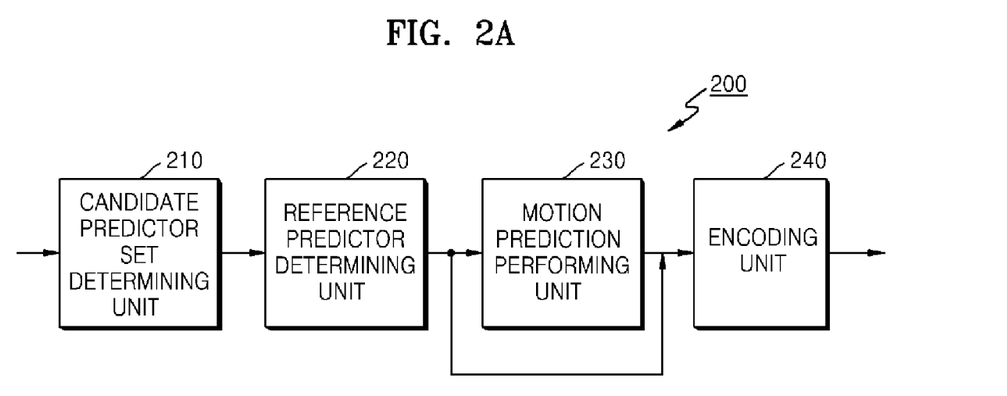
FIG. 2A is a block diagram of an image encoding apparatus according to an exemplary embodiment of the present invention.

FIG. 2A is a block diagram of an image encoding apparatus 200 according to an exemplary embodiment of the present invention. Referring to FIG. 2A, the image encoding apparatus 200 comprises a candidate predictor set determining unit 210, a reference predictor determining unit 220, a motion prediction performing unit 230, and an encoding unit 240.

The candidate predictor set determining unit 210 determines at least one candidate predictor set including at least one candidate predictor within a candidate predictor range in view of a location of a current predictor on a reference frame corresponding to a current block in a reference frame that is input into the image encoding apparatus 200, and outputs the determined candidate predictor set to the reference predictor determining unit 220.

The predictors may be blocks used for motion prediction or pixels at locations representing pixels. Also, the predictors are reference blocks of a reference frame with regard to a current block of a current frame that is to be encoded or decoded.

The candidate predictor set determining unit 210 determines the candidate predictor range including a plurality of candidate predictors in the reference frame that is input into the image encoding apparatus 200 in order to determine a reference predictor with regard to a current predictor. The candidate predictor range may include a predictor at a location of the current predictor of the reference frame and predictors at a predetermined distance in view of the location of the current predictor. For example, the candidate predictor range may be at least one of predictor ranges away from the location of the current predictor by a quarter-pel unit, a half-pel unit, and an integer-pel unit.

The candidate predictor set determining unit 210 determines the at least one candidate predictor set including the at least one candidate predictor within the determined candidate predictor range. The candidate predictor set may include a set including one predictor, a set including two predictors, and a set including three predictors within the candidate predictor range. The candidate predictor set may include only the set including one predictor, and all sets including the N candidate predictors. In this regard, N is smaller than or equal to the number of total candidate predictors within the candidate predictor range.

The reference predictor determining unit 220 of the image encoding apparatus 200 receives the at least one candidate predictor set from the candidate predictor set determining unit 210, determines the reference predictor based on a distortion rate of hypothesis predictors determined using candidate predictors of the at least one candidate predictor set, and outputs the determined reference predictor to the motion prediction performing unit 230 of the image encoding apparatus 200.

The reference predictor determining unit 220 determines a hypothesis predictor of each candidate predictor set using candidate predictors of each candidate predictor set. The hypothesis predictor of each candidate predictor set may be an average value of candidate predictors of a corresponding candidate predictor set.

The reference predictor determining unit 220 may generate a hypothesis predictor list including the determined hypothesis predictor of each candidate predictor set. A hypothesis predictor of a candidate predictor set that includes the predictor at the location of the current predictor may be ranked higher than hypothesis predictors of candidate predictor sets that do not include the predictor at the location of the current predictor on the hypothesis predictor list. Also, a hypothesis predictor of a candidate predictor set having a small number of candidate predictors may be ranked higher than a hypothesis predictor of a candidate predictor set having a large number of candidate predictors.

The reference predictor determining unit 220 determines the reference predictor based on the distortion rate of hypothesis predictors. A block corresponding to the determined reference predictor is a reference block with regard to a current block.

The motion prediction performing unit 230 of the image encoding apparatus 200 obtains an MSE of a result of motion prediction by using each hypothesis predictor, and determines a hypothesis predictor having a minimum MSE as the reference predictor.

The motion prediction performing unit 230 receives information regarding the reference predictor from the reference predictor determining unit 220, and performs motion prediction with regard to a current frame by using the reference block corresponding to the reference predictor and the current block.

The encoding unit 240 encodes image data including the current frame based on the result of motion prediction performed by the motion prediction performing unit 230. The encoding unit 240 may encode an index indicating location information regarding the reference predictor that is input from the reference predictor determining unit 220. Also, the encoding unit 240 may encode at least one of distance information of the candidate predictor range and direction information of the candidate predictor set that are input from the candidate predictor set determining unit 210.

Figure 2B:
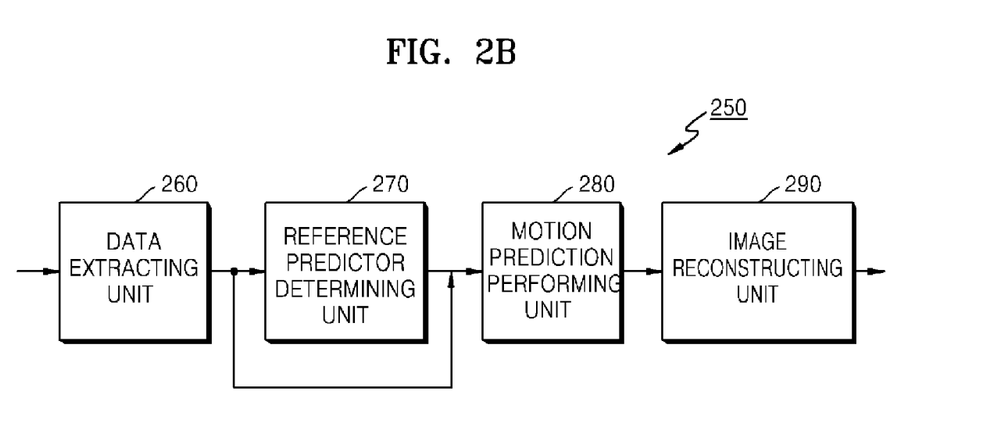
FIG. 2B is a block diagram of an image decoding apparatus according to an exemplary embodiment of the present invention.

FIG. 2B is a block diagram of an image decoding apparatus 250 according to an exemplary embodiment of the present invention. Referring to FIG. 2B, the image decoding apparatus 250 comprises a data extracting unit 260, a reference predictor determining unit 270, a motion prediction performing unit 280, and an image reconstructing unit 290.

The data extracting unit 260 extracts image data, a motion vector, and predictor information for motion prediction from a received image bitstream, and outputs the image data, the motion vector, and the predictor information to the reference predictor determining unit 270 and the motion prediction performing unit 280. The predictor information may be one of index information of a minimum distortion estimating unit, distance information of a candidate predictor range, and direction information of a candidate predictor set.

The reference predictor determining unit 270 determines a reference predictor with respect to a current block in a reference frame by using the predictor information. The reference predictor is a hypothesis predictor having a minimum distortion rate from among hypothesis predictors determined using at least one candidate predictor from among a candidate predictor range away from a location of a current predictor corresponding to the current block.

When the predictor information includes the distance information and the direction information, the reference predictor determining unit 270 may use the distance information to determine a candidate predictor range disposed at a predetermined distance according to the distance information in view of the location of the current predictor, and may use the direction information to determine candidate predictors located in a direction according to the direction information from among the candidate predictor range. The determined candidate predictors may be used to determine a minimum distortion predictor.

If the location information is extracted from the predictor information, the reference predictor determining unit 270 may determine a predictor located at a location according to the location information as the reference predictor.

The motion prediction performing unit 280 uses a reference block corresponding to the reference predictor, the extracted image data, and the motion vector to perform motion prediction with regard to the current frame.

The reconstructing unit 290 reconstructs the current frame based on the prediction result and decodes an entire image.

Figure 3:
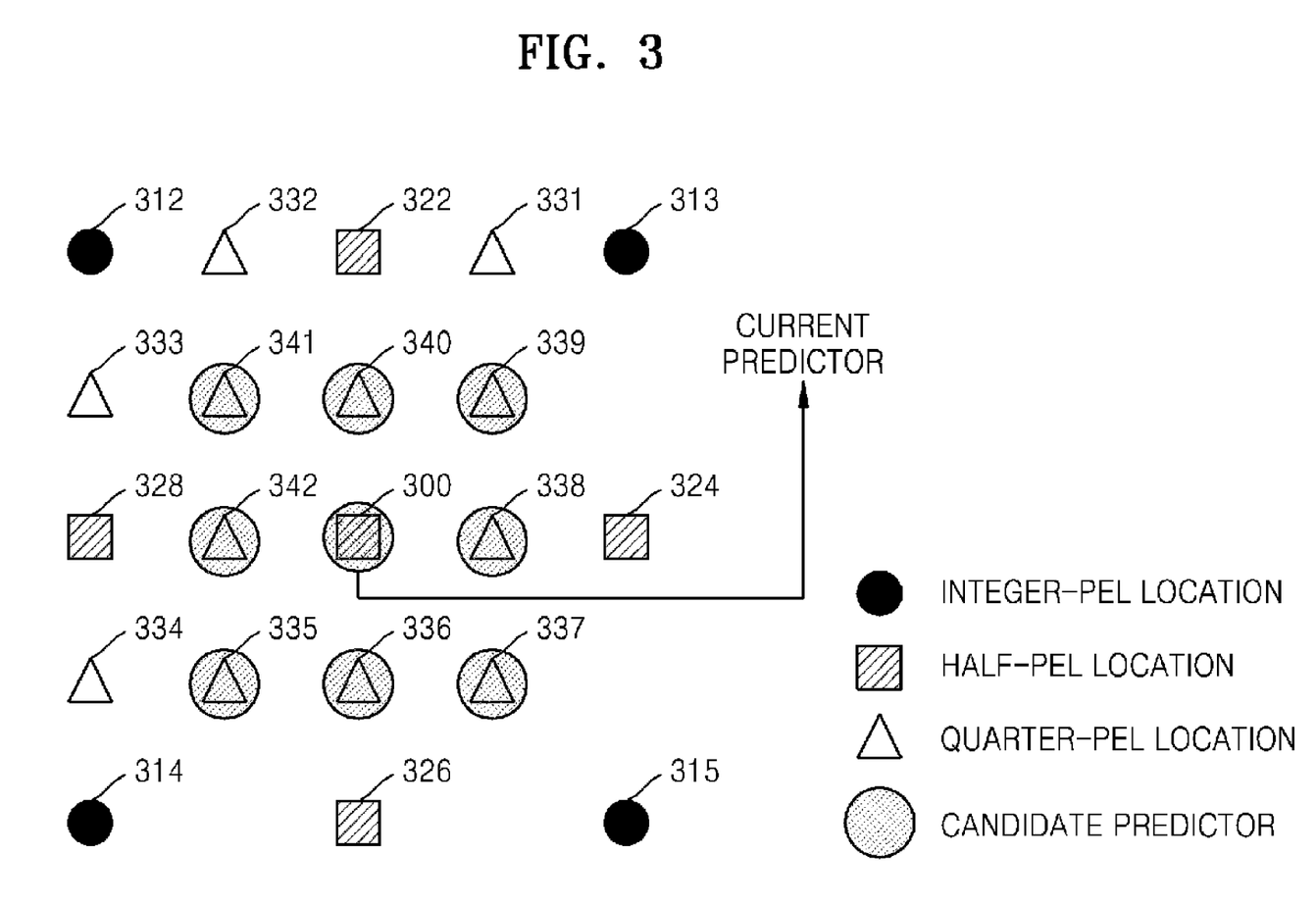
FIG. 3 illustrates pixel unit based predictors.

FIG. 3 illustrates pixel unit based predictors. Referring to FIG. 3, the candidate predictor set determining unit 210 may include predictors 312 through 315 located at a distance of an integer-pel unit, predictors 322, 324, 326, and 328 located at a distance of a half-pel unit, and predictors 331 through 342 located at a distance of one or more quarter-pel units away from a location 300 of a current predictor in a reference frame as candidates of a candidate predictor with regard to the location 300 of the current predictor.

A candidate predictor range includes predictors located a predetermined distance away from the location 300 of the current predictor. For example, the candidate predictor range may include the predictors 312 through 315 located at a distance of an integer-pel unit away from the location 300 of a current predictor. The candidate predictor range may include all the predictors 312 through 315 located at a distance of an integer-pel unit, the predictors 322, 324, 326, and 328 located at a distance of a half-pel unit, and the predictors 331 through 342 located at a distance of one or more quarter-pel units, away from the location 300 of the current predictor. The candidate predictor range may include some predictors from among predictors located the same distance away from the location 300 of the current predictor.

The candidate predictor range of the present exemplary embodiment includes the predictors 335 through 342 that are located at a distance of one quarter-pel unit away from the location 300 of the current predictor and that surround the location 300 of current predictor, and a predictor of the location 300 of the current predictor.

Figure 4:
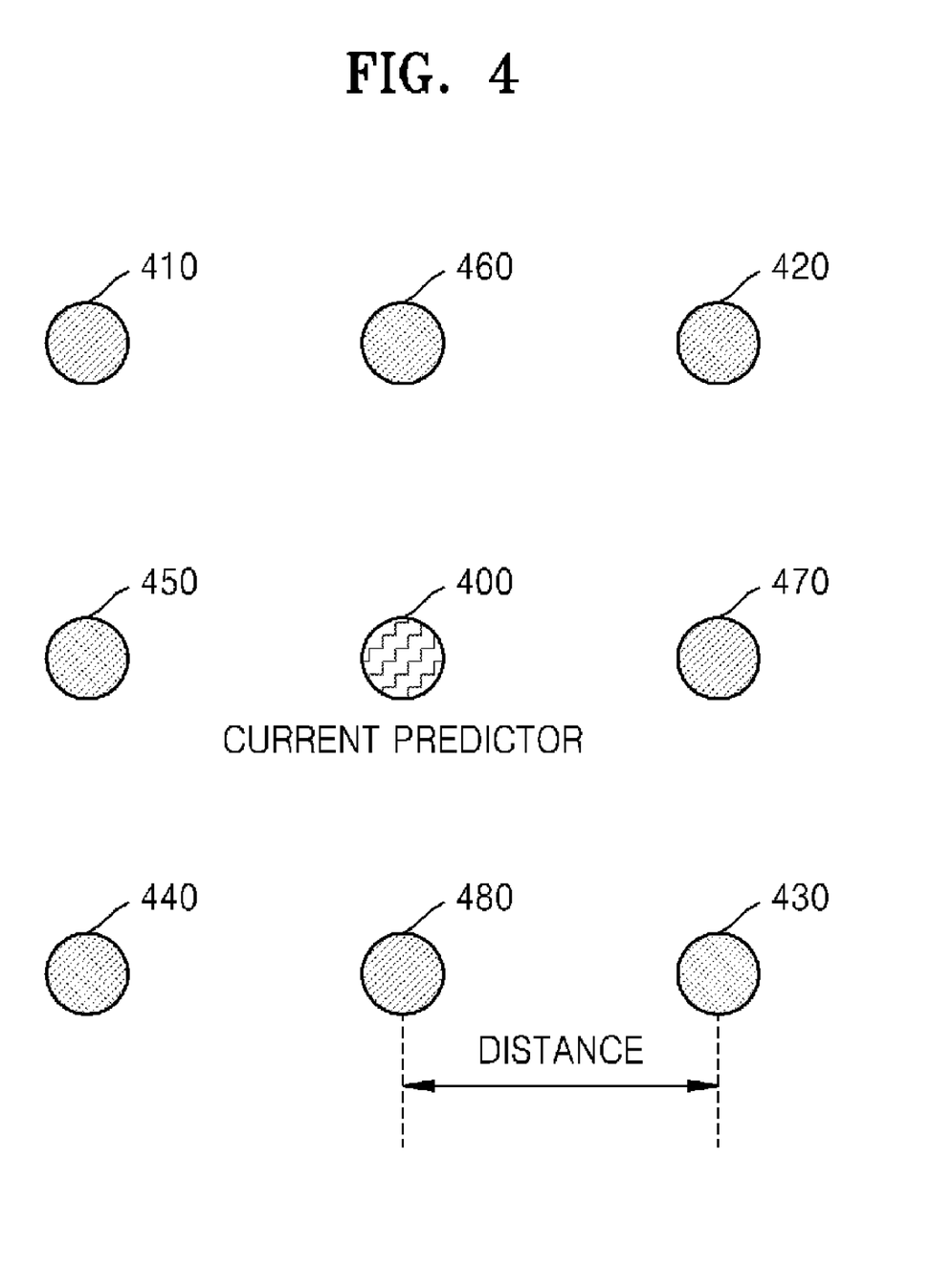
FIG. 4 illustrates a candidate predictor range according to an exemplary embodiment of the present invention.

FIG. 4 illustrates a candidate predictor range according to an exemplary embodiment of the present invention. Referring to FIG. 4, the candidate predictor range includes a location 400 of a current predictor and 8 predictors 410 through 480 surrounding the location 400 of the current predictor. Distances between the predictors 410 through 480 may be adjusted according to an integer-pel unit, a half-pel unit, and a quarter-pel unit.

If the candidate predictor range is based on a quarter-pel unit, the candidate predictor range includes a predictor of the location 400 of the current predictor and the predictors 410 through 480 surrounding the location 400 of the current predictor from among predictors located at a distance of a quarter-pel unit away from the predictor of the location 400 of the current predictor.

If the candidate predictor range is based on a half-pel unit, the candidate predictor range includes the predictor of the location 400 of the current predictor, the predictors 410 through 440 located at a distance of an integer-pel unit away from the location 400 of the current predictor, and the predictors 450 through 480 located at a distance of a half-pel unit away from the location 400 of the current predictor.

Figure 5:
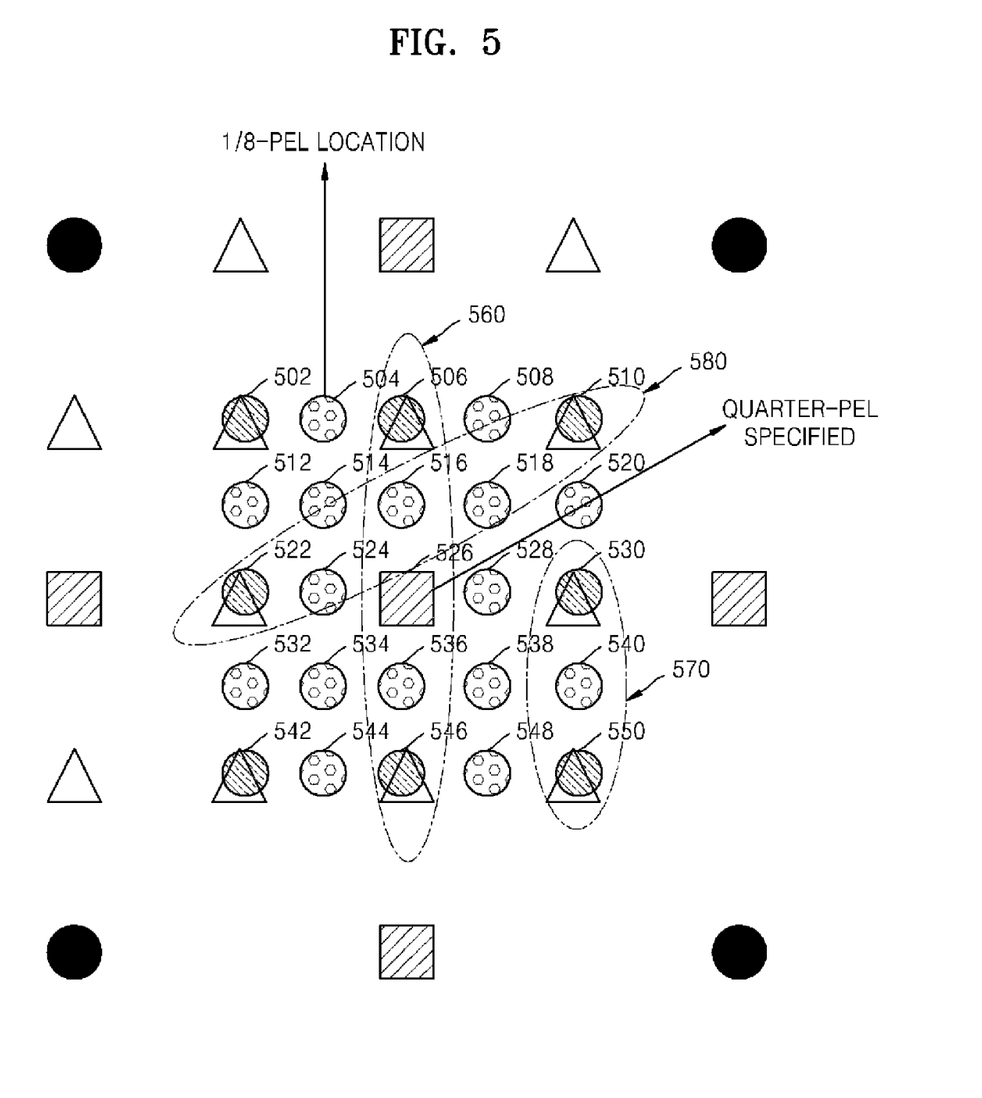
FIG. 5 illustrates a candidate predictor set according to an exemplary embodiment of the present invention.

FIG. 5 illustrates a candidate predictor set according to an exemplary embodiment of the present invention. Referring to FIG. 5, the candidate predictor set determining unit 210 determines at least one candidate predictor set including at least one candidate predictor within a candidate predictor range. The candidate predictor range of the present exemplary embodiment includes 9 predictors including predictors 502, 506, 510, 522, 530, 542, 546, and 550 located at a distance of a quarter-pel unit and surrounding a location 526 of a current predictor and a predictor of the location 526 of the current predictor.

The at least one candidate predictor set includes N candidate predictors included in a candidate predictor range. N is the total number of candidate predictors within the candidate predictor range. For example, the candidate predictor range may include a candidate predictor set 580 including two predictors 510 and 522. Although the same two candidate predictor ranges include two candidate predictor sets including overlapping candidate predictors, the candidate predictor sets differ from each other if the total number of candidate predictors within each candidate predictor set differs.

The at least one candidate predictor set that is to be generated in a candidate predictor range may include all sets from a set including a candidate predictor from among the candidate predictor range to a set including n candidate predictors from among the candidate predictor range (n is an integer number that is greater than 1 and is smaller than or equal to N). For example, if N=9 and n=3, the at least one candidate predictor set may include sets including a candidate predictor from among the candidate predictor range, sets including two candidate predictors from among the candidate predictor range, and sets including three candidate predictors from among the candidate predictor range.

The reference predictor determining unit 220 determines a hypothesis predictor by using candidate predictors of each candidate predictor set. For example, the reference predictor determining unit 220 determines an average location of candidate predictors in a candidate predictor set as the hypothesis predictor. A hypothesis predictor value is an average pixel value of candidate predictors in the candidate predictor set. A predictor 504 located at a distance of a ⅛-pel unit, which corresponds to an average location of two predictors 502 and 506, is determined as the hypothesis predictor determined with regard to the candidate predictor set including the two predictors 502 and 506 located at a distance of a quarter-pel unit.

Likewise, since a predictor 540 located at a distance of a ⅛-pel unit is determined as the hypothesis predictor with regard to the candidate predictor set 570 including two predictors 530 and 550 by a quarter-pel unit, the image encoding apparatus 200 and the image decoding apparatus 250 of an exemplary embodiment of the present invention can perform ⅛-pel unit based prediction in a quarter-pel unit prediction based H.264 environment.

Although the predictor of the location 526 of the current predictor is a hypothesis predictor with regard to a candidate predictor set including a single candidate predictor, a hypothesis predictor with regard to a candidate predictor set 560 including two candidate predictors 506 and 546 may be an average location of the two candidate predictors 506 and 546. Since the number of candidate predictors of the candidate predictor set increases, a predictor at a predetermined location may be redefined and specified.

The reference predictor determining unit 220 generates a hypothesis predictor list in order of hypothesis predictors with regard to a candidate predictor set having a small number of candidate predictors and hypothesis predictors with regard to a candidate predictor set having a large number of candidate predictors. The order of the hypothesis predictor list may be a priority order used to determine a reference predictor with regard to a current block.

Also, among candidate predictor sets including the same number of candidate predictors, a hypothesis predictor with regard to a candidate predictor set that includes the predictor at the location 526 of the current predictor has priority over a hypothesis predictor with regard to a candidate predictor set that does not include the predictor at the location 526 of the current predictor.

The reference predictor determining unit 220 determines an optimum hypothesis predictor having a minimum curvature rate from among hypothesis predictors with regard to candidate predictor sets as the reference predictor. The reference predictor determining unit 220 performs motion compensation using each hypothesis predictor, compares MSEs of hypothesis predictors, and determines a hypothesis predictor generating a minimum MSE as the reference predictor in order to calculate a curvature rate. If the reference predictor is determined, an index indicating information such as a location of the reference predictor may be transmitted.

Figure 6:
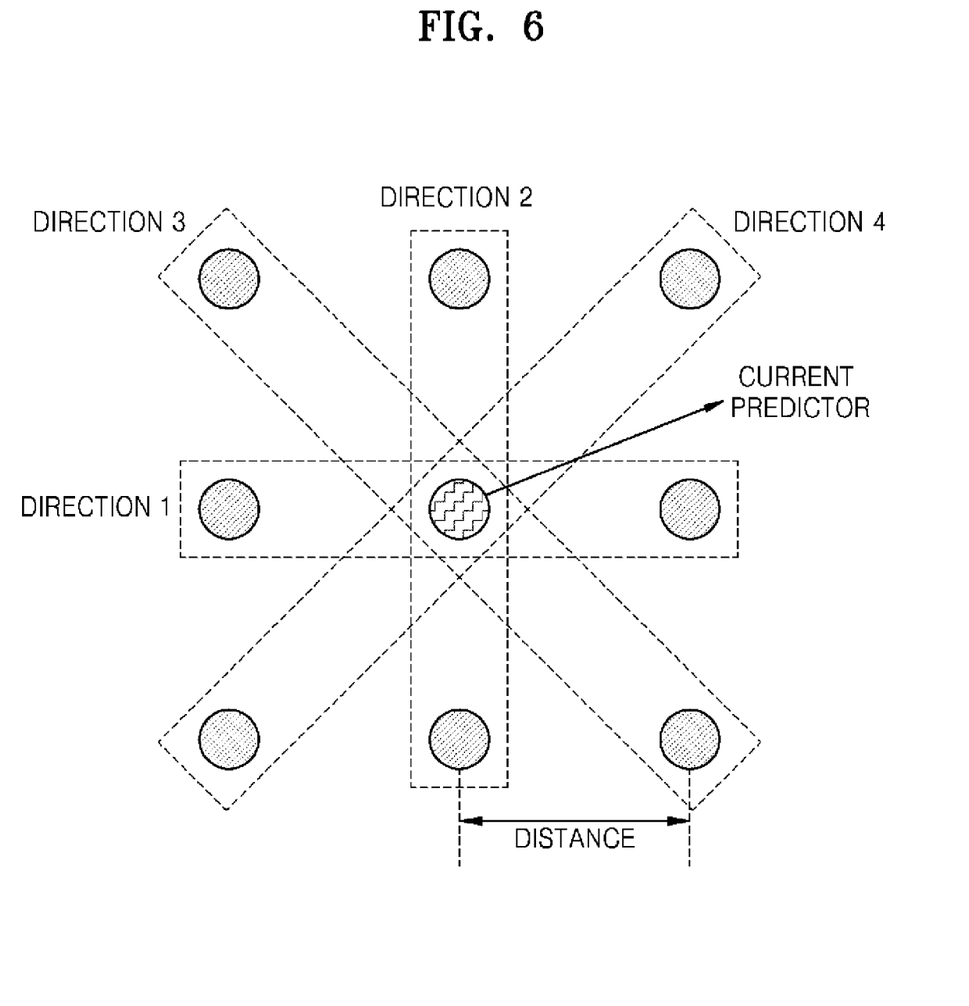
FIG. 6 illustrates a candidate predictor set according to another exemplary embodiment of the present invention.

FIG. 6 illustrates a candidate predictor set according to another exemplary embodiment of the present invention. Referring to FIG. 6, the candidate predictor set determining unit 210 may determine a candidate predictor set including two candidate predictors that face each other in view of a location of a current predictor from among candidate predictors within a candidate predictor range. In this case, a predictor of the location of the current predictor is not included in the candidate predictor set.

The candidate predictor set determining unit 210 may determine candidate predictor sets which each includes two candidate predictors that face each other horizontally, vertically, and diagonally in view of the location of the current predictor. In more detail, the candidate predictor set determining unit 210 determines a candidate predictor set (direction 1) including horizontally facing candidate predictors in view of the location of the current predictor, a candidate predictor set (direction 2) including vertically facing candidate predictors in view of the location of the current predictor, a candidate predictor set (direction 3) including right downward diagonally facing candidate predictors in view of the location of the current predictor, and a candidate predictor set (direction 4) including left downward diagonally facing candidate predictors in view of the location of the current predictor.

Figure 7:
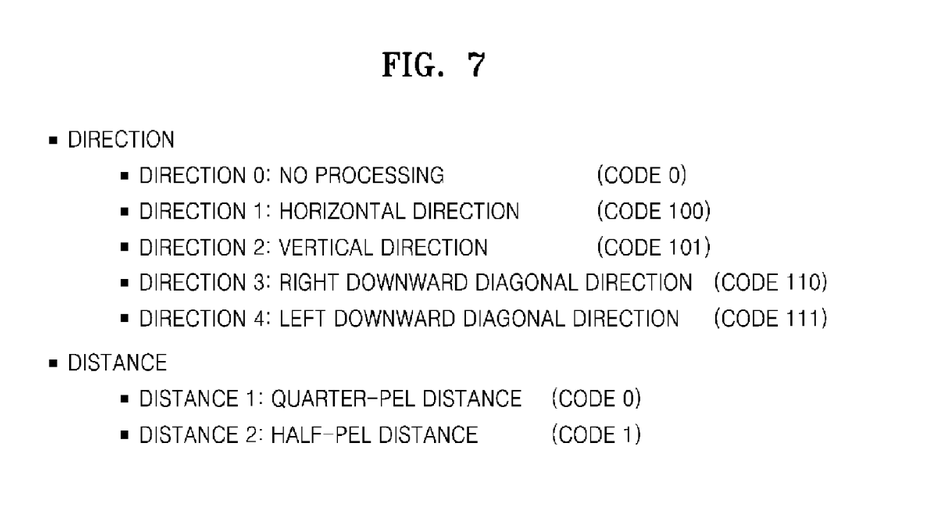
FIG. 7 illustrates a code with regard to a method of determining a candidate predictor range and a candidate predictor set according to an exemplary embodiment of the present invention.

FIG. 7 illustrates a code established with regard to a method of determining a candidate predictor range and a candidate predictor set according to an exemplary embodiment of the present invention.

The image encoding apparatus 200 may encode information regarding the method of determining the candidate predictor range and the candidate predictor set. The image decoding apparatus 250 decodes the information regarding the method of determining the candidate predictor range and the candidate predictor set, thereby obtaining information regarding a reference predictor.

The candidate predictor range may be defined according to a distance between predictors surrounding a location of a current predictor. For example, if the distance is a half-pel unit, the candidate predictor range includes predictors in an integer-pel unit and predictors in a half-pel unit that surround the location of the current predictor. Referring to FIG. 3, the candidate predictor range includes the predictors 312 through 315 in an integer-pel unit and predictors 322, 324, 326, and 328 in a half-pel unit.

Also, if the distance is a quarter-pel unit, the candidate predictor range includes predictors surrounding the location of the current predictor from among predictors located at a distance of a quarter-pel unit away from the location of the current predictor. Referring to FIG. 3, the candidate predictor range includes the predictors 335 through 342 in a quarter-pel unit.

If the method of determining the candidate predictor set is limited as shown in FIG. 6, the candidate predictor set may be defined according to a direction in which candidate predictors face each other in view of the location of the current predictor. In more detail, the candidate predictor set may be defined as directions 1, 2, 3, and 4.

As described above, a previous encoding of the information regarding the method of determining the candidate predictor range and the candidate predictor set can increase its usability.

The image encoding apparatus 200 may comprise a distance code establishing unit that establishes information regarding a predetermined distance between the location of the current predictor to candidate predictors within the candidate predictor range as a distance code, a direction code establishing unit that establishes information regarding types of directions of candidate predictors included in a candidate predictor set away from the location of the current predictor as a direction code, and a code outputting unit that outputs the distance code and the direction code.

The distance code establishing unit establishes a distance of a quarter-pel unit as a distance code of 0, and a distance of a half-pel unit as a distance code of 1. Referring to FIG. 7, the direction code establishing unit establishes direction 1 as a direction code 100, direction 2 as a direction code 101, direction 3 as a direction code 110, and direction 4 as a direction code 111. The direction code establishing unit establishes a direction code 0 when a plurality of hypothesis predictors is not used. The distance code establishing unit establishes the distance codes except in the case of the direction code 0.

Since the candidate predicator set is determined according to each code, the image encoding apparatus 200 transmits the direction codes and the distance codes indicating reference predictors to the image decoding apparatus 250, and the image decoding apparatus 250 can identify reference predictors according to the received direction codes and distance codes.

Figure 8:
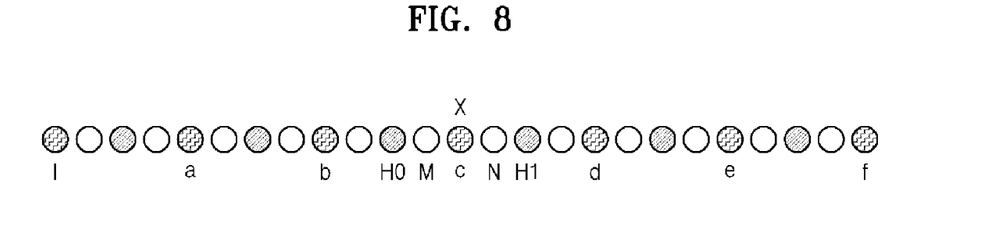
FIG. 8 illustrates a candidate predictor range in an integer-pel unit according to an exemplary embodiment of the present invention.

FIG. 8 illustrates a candidate predictor range in an integer-pel unit according to an exemplary embodiment of the present invention. Referring to FIG. 8, when the candidate predictor range is determined in the integer-pel unit, a process for obtaining a predictor X is as follows.

When a neighboring predictor in a distance of a single unit is used, the predictor X is determined as $X=(M+N)/2$. Since a predictor M is determined as $M=(H0+c)/2$ and a predictor N is determined as $N=(H1+c)/2$, the predictor X is determined as $X=(M+N)/2=(H0+2c+H1)/2$. A predictor H0 is $H0=(1-5a+20b+20c-5d+e)/32$ and a predictor H1 is $H1=(a-5b+20c+20d-5e+f)/32$ according to 6 tap filter interpolation of the H.264 standard, so that the predictor X is determined as $X=(H0+2c+H1)/2=(1-4a+15b+104c+15d-4e+f)/64$. The predictor X is determined by using a 7 tap filter with regard to predictors in an integer-pel unit.

When a neighboring predictor in a distance of two units is used, the predictor X is determined as $X=(H0+H1)/2$, and, if the predictors H0 and H1 are substituted for the predictor X, the predictor X is determined as $X=(1-4a+15b+40c+15d-4e+f)/64$. In this case, the predictor X is determined by filtering predictors in an integer-pel unit by using a 7 tap filter.

According to a method of predicting a multi-hypothesis of an exemplary embodiment of the present invention, various filtering results can be obtained other than by performing fixed 6 tap filtering or interpolation.

Figure 9:
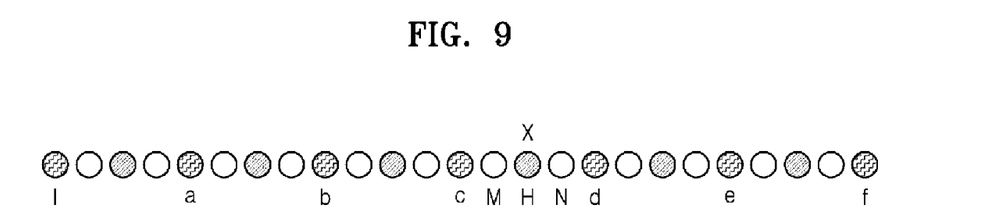
FIG. 9 illustrates a candidate predictor range in a half-pel unit according to an exemplary embodiment of the present invention.

FIG. 9 illustrates a candidate predictor range in a half-pel unit according to an exemplary embodiment of the present invention. Referring to FIG. 9, when the candidate predictor range is determined in a half-pel unit, a process for obtaining a predictor X is as follows.

When a neighboring predictor in a distance of a single unit is used, the predictor X is determined as $X=(M+N)/2$. Since a predictor M is determined as $M=(c+H)/2$ and a predictor N is determined as $N=(d+H)/2$, the predictor X is determined as $X=(M+N)/2=(c+2H+d)/2$. A predictor H is determined as $H=(a-5b+20c+20d-5e+f+16)/32$ according to 6 tap filtering of the H.264 standard, so that the predictor X is determined by performing 1:2:1 filtering with regard to predictors c, d, and H in an integer-pel unit.

When a neighboring predictor in a distance of two units is used, since the predictor X is determined as $X=(c+d)/2$, the predictor X may be determined by performing overlapping line type filtering with regard to predictors c and d.

Therefore, various filtering results can be obtained other than fixed 6 tap filtering with regard to the predictors in an integer-pel unit.

Figure 10:
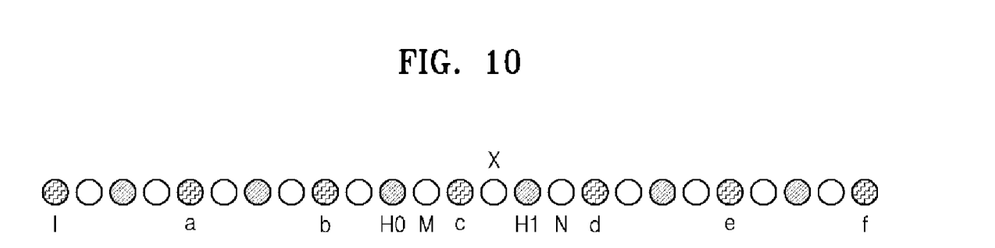
FIG. 10 illustrates a candidate predictor range in a quarter-pel unit according to an exemplary embodiment of the present invention.

FIG. 10 illustrates a candidate predictor range in a quarter-pel unit according to an exemplary embodiment of the present invention. Referring to FIG. 10, when the candidate predictor range is determined as a quarter-pel unit, a process for obtaining a predictor X is as follows.

When a neighboring predictor in a distance of a single unit is used, the predictor X is determined as $X=(c+H1)/2$, which is the same result as overlapping line type filtering used to determining predictors in a quarter-pel unit in the H.264 standard.

When a neighboring predictor in a distance of two units is used, since a predictor M is determined as $M=(c+H0)/2$ and a predictor N is determined as $N=(d+H1)/2$, the predictor X is determined as $X=(M+N)/2=(H0+c+H1+d)/4$. Therefore, if the predictors H0 and H1 are substituted for the predictor X, the predictor X is determined as $X=(1-4a+15b+72c+47d-4e+f)/64$, and a result obtained by performing 7 tap filtering with regard to predictors in an integer-pel unit is obtained, which produces an effect of various types of filtering.

Figure 11A:
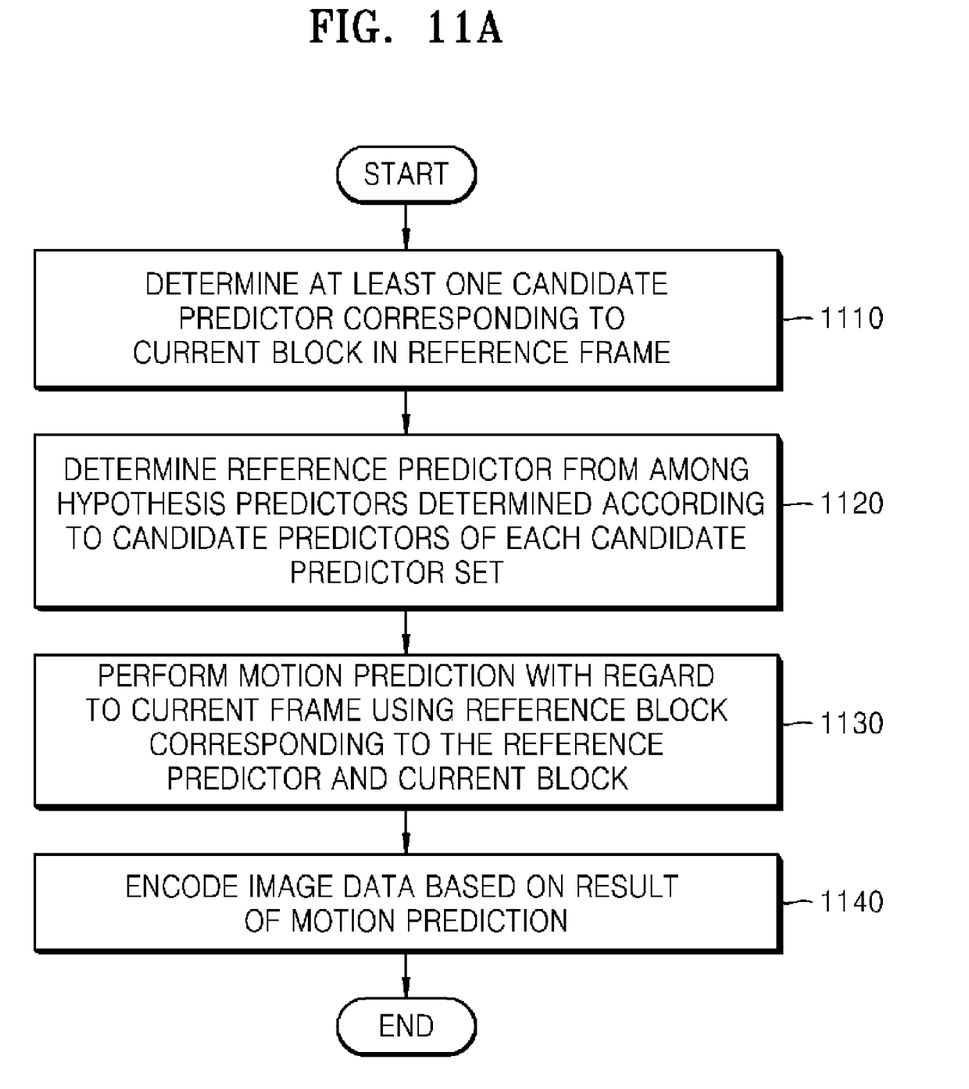
FIG. 11A is a flowchart illustrating an image encoding method according to an exemplary embodiment of the present invention.

FIG. 11A is a flowchart illustrating an image encoding method according to an exemplary embodiment of the present invention. Referring to FIG. 11A, at least one candidate predictor set including at least one candidate predictor within a candidate predictor range in view of a location of a current predictor corresponding to a current block is determined in a reference frame (operation 1110).

A reference predictor is determined based on a distortion rate of hypothesis predictors determined according to candidate predictors of each candidate predictor set (operation 1120). A hypothesis predictor list including hypothesis predictors of each candidate predictor set may be generated. Hypothesis predictors may be determined as an average value of candidate predictors of each candidate predictor set.

MSEs with regard to results of motion prediction using each hypothesis predictor may be compared, and a hypothesis predictor having a minimum MSE may be determined as the reference predictor.

A reference block corresponding to the reference predictor and a current block are used to perform motion prediction with regard to a current frame (operation 1130).

Image data including the current frame is encoded based on a result obtained by performing motion prediction (operation 1140). An index of reference predictors may be encoded and transmitted. Distance information of the candidate predictor range and direction information of the candidate predictor set may be encoded and transmitted.

Figure 11B:
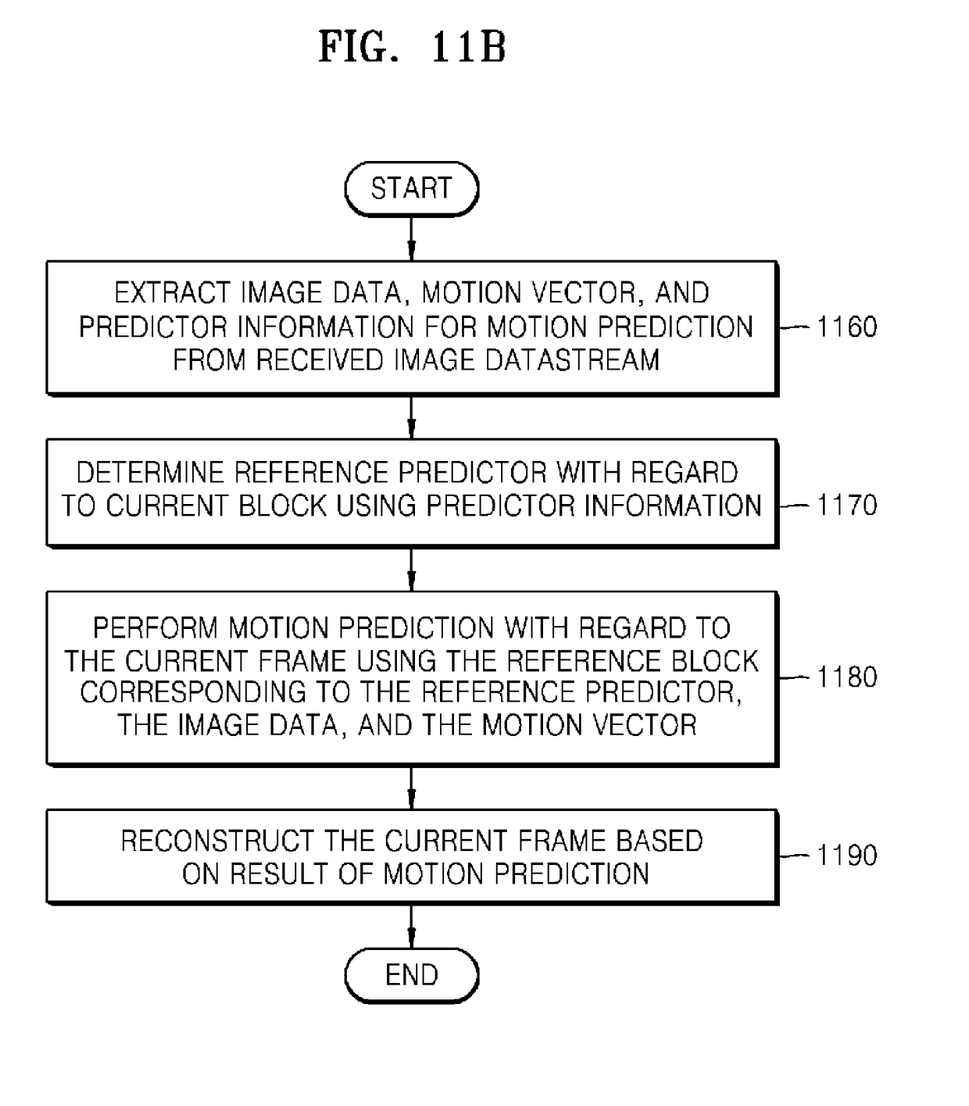
FIG. 11B is a flowchart illustrating an image decoding method according to an exemplary embodiment of the present invention.

FIG. 11B is a flowchart illustrating an image decoding method according to an exemplary embodiment of the present invention. Referring to FIG. 11B, image data, a motion vector, and predictor information for motion prediction are extracted from a received image datastream (operation 1160). The predictor information may be location information of a reference predictor. The predictor information may be at least one of distance information of a candidate predictor range and direction information of a candidate predictor set used to determine the reference predictor.

The predictor information is used to determine the reference predictor with regard to a current block (operation 1170). The reference predictor is determined as a predictor having a minimum distortion rate among hypothesis predictors determined using at least one candidate predictor within a candidate predictor range in view of a location of a current predictor corresponding to the current block.

The reference block corresponding to the reference predictor, the image data, and the motion vector are used to perform motion prediction with regard to the current frame (operation 1180).

The current frame is reconstructed based on a result of motion prediction (operation 1190).

Exemplary embodiments of the present invention can be implemented through computer readable code/instructions stored on a medium, e.g., a computer readable medium, to control at least one processing element to implement any above described exemplary embodiment. The computer readable recording medium can be any data storage device that can store data which can be thereafter read by a computer system. Examples of the computer readable recording medium include read-only memory (ROM), random-access memory (RAM), compact disc (CD)-ROMs, magnetic tapes, floppy disks, and optical data storage devices. In another exemplary embodiment, the medium may include transmission media, such as carrier waves, but the present invention is not limited thereto.

The method and apparatus for encoding an image using motion estimation according to exemplary embodiments of the present invention combine a plurality of blocks or predictors, thereby effectively and precisely performing motion prediction.

The method and apparatus for encoding an image using motion estimation according to exemplary embodiments of the present invention extract information regarding a reference block indicating a minimum distortion from a received data stream, thereby enhancing performance of interprediction through precise and efficient motion prediction.

The method and apparatus for encoding and decoding an image using motion estimation of the present invention can be used in a temporal prediction based video codec that can be used in a mobile phone, a camcorder, a digital camera, a multimedia player, a next-generation DVD, software video code, and the like, which are based on the temporal prediction based video codec.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding an image by using motion prediction, the method comprising:
   determining at least one candidate predictor set including at least one candidate predictor within a candidate predictor range away from a location of a current predictor in a reference frame;
   determining a reference predictor based on a distortion rate of hypothesis predictors determined according to the at least one candidate predictor of each of the at least one candidate predictor set;
   performing motion prediction with regard to a current frame by using a reference block corresponding to the reference predictor and a current block; and
   encoding image data including the current frame based on a result of the motion prediction.

2. The method of claim 1, wherein the determining of the reference predictor comprises:
   generating a hypothesis predictor list including the hypothesis predictors of each of the at least one candidate predictor set; and
   determining the reference predictor based on the distortion rate of the hypothesis predictors of the hypothesis predictor list.

3. The method of claim 2, wherein, in the generating of the hypothesis predictor list, a hypothesis predictor of a candidate predictor set that includes a candidate predictor at the location of the current predictor is ranked higher than hypothesis predictors of candidate predictor sets that do not include the candidate predictor at the location of the current predictor on the hypothesis predictor list.

4. The method of claim 2, wherein, in the generating of the hypothesis predictor list, a hypothesis predictor of a candidate predictor set having a small number of candidate predictors is ranked higher than a hypothesis predictor of a candidate predictor set having a large number of candidate predictors.

5. The method of claim 1, wherein the encoding of the image data comprises: encoding an index of the reference predictor.

6. The method of claim 1, wherein, in the determining of the at least one candidate predictor set, the candidate predictor range comprises at least one of a first range including predictors at a location a quarter-pel unit from the location of the current predictor, a second range including predictors at a location a half-pel unit from the location of the current predictor, a third range including predictors at a location an integer-pel unit from the location of the current predictor, and a predictor at the location of the current predictor.

7. The method of claim 1, wherein, in the determining of the at least one candidate predictor set, the at least one candidate predictor set comprises a first set including a candidate predictor, a second set including two candidate predictors, and a third set including three candidate predictors within the candidate predictor range.

8. The method of claim 1, wherein the determining of the reference predictor comprises:
   for each of the at least one candidate predictor set, determining one of the hypothesis predictors as an average value of candidate predictors of said each candidate predictor set; and
   comparing distortion rates of the hypothesis predictors and determining a hypothesis predictor having a minimum distortion rate as the reference predictor.

9. The method of claim 1, wherein the determining of the reference predictor comprises:
   obtaining a mean squared error (MSE) with regard to the result of the motion prediction by using each of the hypothesis predictors; and
   comparing the MSE of each of the hypothesis predictors and determining a hypothesis predictor having a minimum MSE as the reference predictor.

10. The method of claim 1, wherein the determining of the at least one candidate predictor set comprises:
    determining the candidate predictor range, said candidate predictor range comprising four predictors respectively located in an up, down, left, and right direction at a predetermined distance from the location of the current predictor, and four predictors respectively located at both sides of two diagonals which pass through the location of the current predictor; and determining two candidate predictors that face each other with respect to the location of the current predictor from among the candidate predictors within the determined candidate predictor range to form a same candidate predictor set.

11. The method of claim 10, further comprising:
encoding information regarding the predetermined distance within the candidate predictor range and information regarding directions of the candidate predictors that form the at least one candidate predictor set.

12. A non-transitory computer-readable recoding medium having recorded thereon a program for implementing the method of encoding an image by using motion prediction of claim 1.

13. A method of decoding an image by using motion prediction, the method comprising:
extracting image data, a motion vector, and predictor information for motion prediction from a received image datastream;
determining a reference predictor with regard to a current block by using the predictor information;
performing motion prediction with regard to a current frame by using a reference block corresponding to the reference predictor, the image data, and the motion vector; and
reconstructing the current frame based on a result of the motion prediction,
wherein the reference predictor is determined as having a minimum distortion rate from among hypothesis predictors determined using at least one candidate predictor within a candidate predictor range away from a location of a current predictor in a reference frame.

14. The method of claim 13, wherein the determining of the reference predictor comprises:
extracting location information from the predictor information; and
determining the reference predictor to be located as indicated by the location information regarding the reference frame.

15. The method of claim 13, wherein the determining of the reference predictor comprises:
extracting distance information and direction information from the predictor information;
determining the candidate predictor range located a predetermined distance according to the distance information from the location of the current predictor on the reference frame by using the distance information;
determining candidate predictors located in a direction according to the direction information within the candidate predictor range by using the direction information; and
determining the reference predictor having the minimum distortion rate by using the candidate predictors.

16. A non-transitory computer-readable recoding medium having recorded thereon a program for implementing the method of decoding an image by using motion prediction of claim 13.

17. An apparatus for encoding an image by using motion prediction, the apparatus comprising:
a candidate predictor set determining unit which determines at least one candidate predictor set including at least one candidate predictor within a candidate predictor range away from a location of a current predictor in a reference frame;
a reference predictor determining unit which determines a reference predictor based on a distortion rate of hypothesis predictors determined according to the at least one candidate predictor of each of the at least one candidate predictor set;
a motion prediction performing unit which performs motion prediction with regard to a current frame by using a reference block corresponding to the reference predictor and a current block; and
an encoding unit which encodes image data including the current frame based on a result of the motion prediction.

18. The apparatus of claim 17, wherein the reference predictor determining unit generates a hypothesis predictor list including the hypothesis predictors of each of the at least one candidate predictor set, and determines the reference predictor based on the distortion rate of the hypothesis predictors of the hypothesis predictor list.

19. The apparatus of claim 17, wherein the encoding unit comprises: a predictor index encoding unit which encodes an index of the reference predictor.

20. The apparatus of claim 17, wherein, for each of the at least one candidate predictor set, the reference predictor determining unit determines one of said hypothesis predictors as an average value of candidate predictors of said each of the at least one candidate predictor set, and
wherein the reference predictor determining unit compares distortion rates of the hypothesis predictors with regard to each of the at least one candidate predictor set, and determines a hypothesis predictor having a minimum distortion rate as the reference predictor.

21. The apparatus of claim 17, wherein the reference predictor determining unit obtains a mean squared error (MSE) with regard to the result of the motion prediction by using each of the hypothesis predictors, compares the MSE of each of the hypothesis predictors, and determines a hypothesis predictor having a minimum MSE as the reference predictor.

22. The apparatus of claim 17, wherein the encoding unit encodes image data including the current frame based on the result of the motion prediction, and encodes information regarding a predetermined distance indicating the candidate predictor range and information regarding directions of the at least one candidate predictor that forms the at least one candidate predictor set.

23. An apparatus for decoding an image by using motion prediction, the apparatus comprising:
a data extracting unit which extracts image data, a motion vector, and predictor information for motion prediction from a received image datastream;
a reference predictor determining unit which determines a reference predictor with regard to a current block by using the predictor information;
a motion prediction performing unit which performs motion prediction with regard to a current frame by using a reference block corresponding to the reference predictor, the image data, and the motion vector; and
an image reconstructing unit which reconstructs the current frame based on a result of the motion prediction,
wherein the reference predictor is determined as having a minimum distortion rate from among hypothesis predictors determined using at least one candidate predictor within a candidate predictor range in view of a location of a current predictor in a reference frame.

24. The apparatus of claim 23, wherein the reference predictor determining unit extracts location information from the predictor information, and determines the reference predictor to be located as indicated by the location information regarding the reference frame.

25. The apparatus of claim 23, wherein the reference predictor determining unit extracts distance information and direction information from the predictor information, determines the candidate predictor range located a predetermined distance according to the distance information from the location of the current predictor on the reference frame by using the distance information, determines candidate predictors located in a direction according to the direction information within the candidate predictor range by using the direction information, and determines the reference predictor having the minimum distortion rate by using the candidate predictors.

* * * * *